United States Patent [19]

Geidies et al.

[11] 4,328,011

[45] May 4, 1982

[54] PROCESS FOR PURIFYING AND COOLING PARTIAL OXIDATION GASES CONTAINING DUST-LIKE IMPURITIES

[75] Inventors: Ulrich Geidies, Waltrop; Gerhard Wilmer, Hattingen-Niederwenigern, both of Fed. Rep. of Germany

[73] Assignee: Krupp-Koppers GmbH, Essen, Fed. Rep. of Germany

[21] Appl. No.: 92,713

[22] Filed: Nov. 9, 1979

Related U.S. Application Data

[63] Continuation of Ser. No. 840,004, Oct. 7, 1977, abandoned.

[30] Foreign Application Priority Data

Oct. 16, 1976 [DE] Fed. Rep. of Germany ....... 2646865

[51] Int. Cl.$^3$ .............................................. B01D 47/00
[52] U.S. Cl. .......................................... 55/89; 55/93; 55/222; 48/197 R
[58] Field of Search ................... 55/68, 73, 80, 84, 85, 55/93, 94, 222; 48/197 R, 206, 215; 252/373

[56] References Cited

U.S. PATENT DOCUMENTS

| | | | |
|---|---|---|---|
| 2,822,062 | 2/1958 | Haberl | 55/85 |
| 2,961,310 | 11/1960 | Steever | 48/206 |
| 2,967,588 | 1/1961 | Swart | 55/94 |
| 3,971,635 | 7/1976 | Matthews | 48/206 |
| 4,066,420 | 1/1978 | Danguillier et al. | 252/373 |

OTHER PUBLICATIONS

Lapple Fluid & Particle Mechanics, 3/56, University of Delaware, pp. 307 & 308.

*Primary Examiner*—Bernard Nozick
*Attorney, Agent, or Firm*—Michael J. Striker

[57] ABSTRACT

The hot partial oxidation gases which are formed in a gasifier for solid or liquid fuel are passed first into a dust separator under conditions where 70 to 95% of the impurities are eliminated, whereupon the gases then are washed in a wet washer with an amount of water not higher than necessary to remove the residual dust impurities. The process has the particular advantage of a very low amount of drainage water and has a high safety factor and adaptability for different conditions.

5 Claims, 1 Drawing Figure

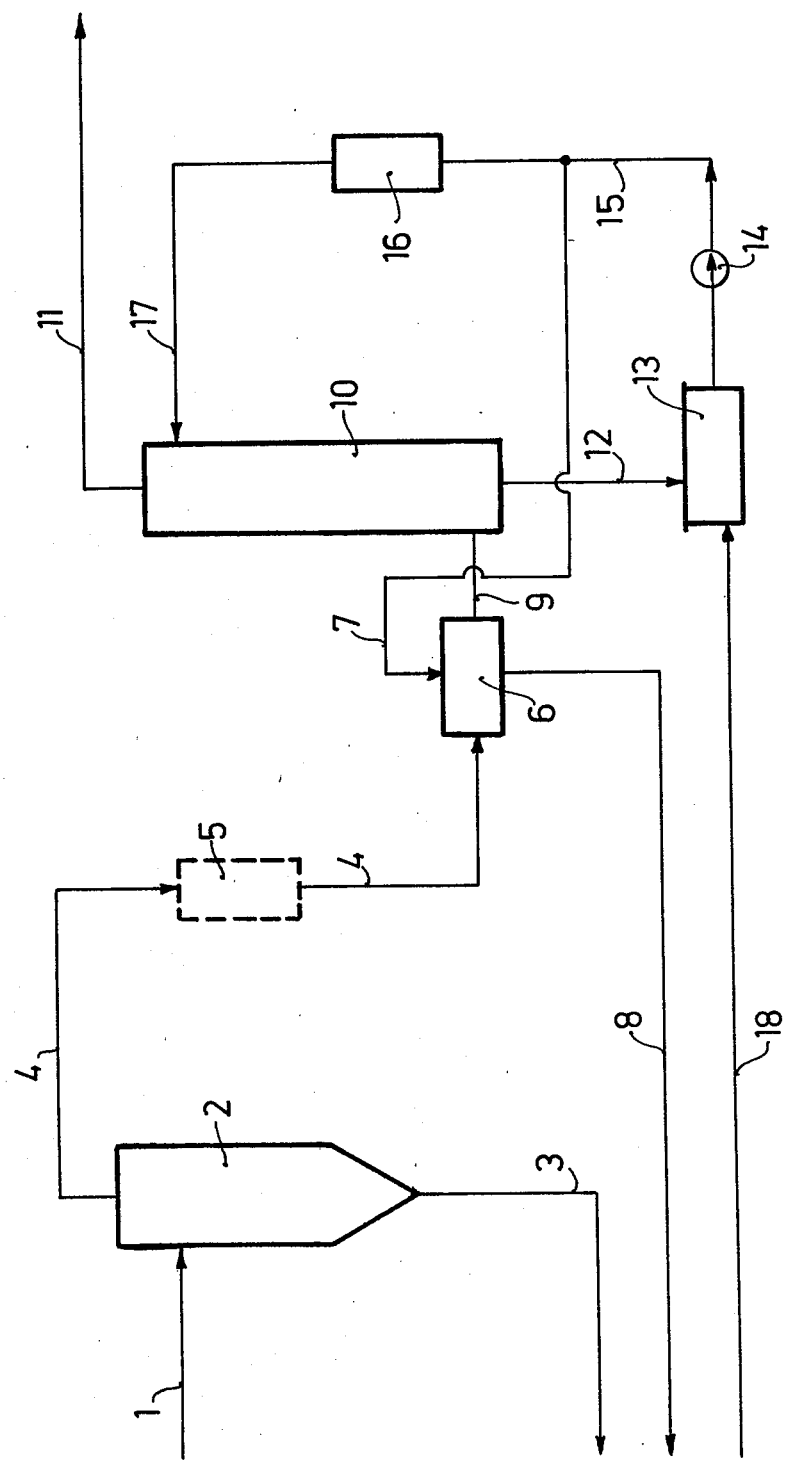

PROCESS FOR PURIFYING AND COOLING PARTIAL OXIDATION GASES CONTAINING DUST-LIKE IMPURITIES

This is a continuation of application Ser. No. 840,004, filed Oct. 7, 1977, now abandoned.

BACKGROUND OF THE INVENTION

The invention relates to a process for cleaning and cooling partial oxidation gases containing dust-like impurities.

It is generally known that partial oxidation gases can be obtained by the gasification of solid and/or liquid fuels such as coal, coal dust or heavy heating oils by concurrent flow gasification of the fuel and air or oxygen. The partial oxidation gases then contain essentially only solids which are of dust-like structure. The gases, on the other hand, do no longer contain any amounts or any mentionable amounts of higher boiling hydrocarbons such as oils, tars, benzene, phenols or similar compounds. A wellknown and broadly used process for the concurrent gasification is the Koppers-Totzek process which is being used at normal or only slightly increased gasification pressure.

The dust-like impurities of these partial oxidation gases consist essentially of soot, coal dust and fly ash (flue dust) which occur as gasification residue in amounts of about 60 to 100 g/Nm$^3$. These are entrained with the gases out of the gasifier and must therefore be eliminated from the gas flow. The partial oxidation gases also contain gaseous impurities, in particular $H_2S$, HCN, COS and $CO_2$ which likewise must be eliminated in the course of the further processing.

In view of the absence of the mentioned higher boiling hydrocarbons in these gases it has been the practice to pass the hot gases received from the gasifier into socalled scrubbers (cooling washers). The gases in these scrubbers were cooled by direct contact with water and the dust-like impurities were thus washed out. A diagram of this type of process has for instance been published in the publication "Erdöl and Kohle," Vol. 28 (1975), page 84, FIG. 6.

This procedure, however, has the disadvantage that it results in comparatively large amounts of waste water since the wash water drained from the scrubbers because of the dust-like impurities suspended therein cannot be discharged to the outside without preceding purification. Besides, the wash water depending on the pressure employed in the cooling and washing step contains more or less large amounts of offensive smelling and poisonous components such as $H_2S$, HCN and COS in solutions which likewise must be eliminated.

The treatment of the waste water occurring in the scrubbing of partial oxidation gases therefore constitutes presently a serious problem because of the constantly increasing governmental restrictions and requirements for protection of the environment. These problems are accentuated by the fact that the coal gasification in accord with other branches of modern technology tends to aim at increased throughputs which again result in increased waste-water amounts.

Because of all these problems one could think of eliminating the dust-like impurities from the gas by a dry gas purification. It has, however, been found that, with the prior art dust separators, a complete elimination of the dust-like impurities from the gas stream is impossible because the impurities always include a portion of particles below 10 micron grain size which are not taken up by the dust separators. The use of electrofilters or similar devices is likewise not advisable. The reason is that in case of any interference in the operation of the gasifier unreacted oxygen may reach the electrofilter together with the partial oxidation gas and may cause an explosion.

It is therefore an object of the present invention to provide for a process of purifying and cooling partial oxidation gases which contain dust-like impurities which process on one hand should assure, if possible, a complete elimination of the dust-like components and, on the other hand, should result in only a relatively small waste-water amount. In addition, the process must be absolutely safe and must have a high flexibility in regard to the type of gas cooling.

SUMMARY OF THE INVENTION

This object is solved by passing the gases first into a dust separator under conditions where 70 to 95% of the dust-like impurities are eliminated and then passing the gas into a wet washer operating with an amount of water not higher than necessary to remove the residual dust impurities.

The process of the invention therefore avoids a direct contact of the hot gases with water in the first process stage. The gases rather are subjected to a treatment in the dust separator which results only in a 70 to 95% elimination of the dust. The preferred form of dust separators are cyclones of conventional type. The entry speed preferred for the required degree of separation is in the range of 15 to 25 m/sec. In this process stage it is possible also to use gravity separators or impingement separators.

The dust particles which so far have not been removed from the gas are then subsequently washed out in a conventional wet washer. This wet washer can for instance be a disintegrator, a spray washer or a Venturi washer. The last type is preferred where the gasification has been carried out under pressure and where the partial oxidation gases therefore are present in condensed form. If, however, the gasification is carried out at atmospheric pressure or at only slightly increased pressure up to about 0.3 atmospheres above atmospheric, disintegrators are preferred as wet washers.

According to the invention the wet washer itself has no cooling function. It is therefore charged only with such an amount of water as is sufficient for washing out the residual dust amounts from the gas stream. For this reason the wash water amount necessary for the wet washer is only about 20% of the wash water amount which heretofore was necessary in so-called cooling washers or scrubbers. Because of the small amounts of dust which must still be eliminated in the wet wash step and in view of the comparatively small amount of wash water necessary for this purpose, only a comparatively small waste water treatment installation is necessary for processing the suspension of dust and wash water which constitutes the drainage from this process step.

As for the cooling of the gas the invention permits a high flexibility. Normally, the gas flowing out of the gasifier may be subjected to a pre-cooling step in a waste boiler prior to entering the dust separator. The waste boiler can be arranged immediately following the gasifier or may even constitute a structural unit with the gasifier.

It will be understood that the gas stream in the further course of the processing, that is, when passing through the dust separator and the wet washer undergoes a corresponding cooling. If the gases coming from the wet washer require still further cooling this can be effected in view of the meanwhile accomplished removal of most of the dust by direct gas cooling, for instance in a cooler filled with packing material, a hurdle type cooler or a spray condenser cooler. This final direct gas cooling is particularly advisable in case of low gas pressures because of the high fraction of steam in the gas.

The condensation of the steam is particularly preferred where, in the further processing, a high condensation of the gas is effected and where therefore the steam because of its volume and the formation of condensates in subsequent condensers and coolers would be an interfering factor.

According to the invention the cooler provided for the direct gas cooling is operated with an internal water circuit. This means that the cooling water which is discharged from the direct gas cooler, after the necessary cooling is an indirect cooler, is recirculated into the top of the direct gas cooler. Because of the substantial absence of dust in the gases this circulation of the cooling water presents no difficulties.

It is also possible to subject the hot gases to an intermediate cooling between the dust separator and the wet washer. In this case, however, the indirect gas cooling is preferred since the gases still contain a certain amount of dust.

If it is, however, desired also in this step to use a direct gas cooling it is preferred to limit the amount of water which is added to the gas for cooling purposes in a manner that the water can then completely evaporate in the flowing gas. Thus, the formation of unnecessary dust-containing waste water is avoided.

The entire intermediate cooling described should only be used if circumstances require it, for instance where the temperature of the gas discharged from the cyclone which constitutes the dust separator is too high to permit its processing in a disintegrator at this temperature.

Usually the following temperatures are obtained in the process of the invention during cooling of the gas current:

|     |                                                              | Gas temperatures in °C. |
| --- | ------------------------------------------------------------ | ----------------------- |
| (a) | at the outlet of the gasifier                                | 1 500                   |
| (b) | behind the waste boiler                                      | 300                     |
| (c) | behind the dust separator                                    | 295                     |
| (d) | behind the wet washer (without intermediate cooling of the gas) | 100                  |
| (e) | behind the direct gas cooler                                 | 35                      |

BRIEF DESCRIPTION OF THE DRAWING

The drawing illustrates the process of the invention in a flow diagram.

DESCRIPTION OF THE PREFERRED EMBODIMENTS

EXAMPLE

The example relates to a purification and cooling of a partial oxidation gas which results from the gasification of coal dust in a Koppers-Totzek gasifier at a pressure of 0.03 atmospheres above atmospheric. This gas contained about 100 g/Nm$^3$ of dust-like impurities.

The gas was first cooled to a temperature of 300° in a waste boiler (not shown) which formed one unit with the Koppers-Totzek gasifier.

The gas having this temperature was then passed through the dust indicated as 1 in the drawing with an entry speed of 20 m/sec and a pressure of 0.02 atmospheres above atmospheric into the cyclone 2 which in this case constituted an upright dust separator. The eliminated gas was withdrawn through the duct 3 in an amount of 90 g/Nm$^3$.

The gas discharged from the cyclone 3 which at that point was already 90% dust-free was then passed through duct 4 into the wet washer which in this case was in the form of a disintegrator 6.

In the drawing a device 5 is indicated in broken lines in the course of the duct 4. This should indicate that at this point of the process an intermediate cooling of the gases could have been effected as described above. In the present example, however, no intermediate cooling was used.

In the disintegrator 6 the gas was washed with an amount of water which was just sufficient for removing the residual amount of dust from the gas. For this purpose the wash water was introduced into the disintegrator 6 through duct 7 in an amount of 1.1 l/Nm$^3$. The wash water which is drained from the disintegrator 6 still contains 80 g dust per liter of water. It was passed through duct 8 to a waste water treatment installation which is not illustrated in the drawing.

The mostly dust-free gas which meanwhile had been cooled to a temperature of 100° C. was then passed through duct 9 into the lower portion of the direct gas cooler which here was in the form of an open surface cooler 10. The rising gas there was cooled to a temperature of about 35° C. by the trickling down water. The gas that was then withdrawn through duct 11 had the following composition at the temperature just stated:

| CO$_2$ | 8.4 vol. % |
| --- | --- |
| CO | 63.2 vol. % |
| H$_2$ | 26.1 vol. % |
| N$_2$ | 0.8 vol. % |
| Ar | 0.53 vol. % |
| CH$_4$ | 0.1 vol. % |
| H$_2$S | 0.78 vol. % |
| COS | 0.09 vol. % |

The gas in addition still contained an amount of at most 10 mg dust/Nm$^3$. This gas could then be used as a so-called crude synthesis gas for further processing.

The cooling water drained from the open surface cooler 10 was passed through a duct 12 into the equalizing tank 13. It was then passed from the tank by means of a pump 14 through a duct 15 into the indirect circulation cooler 16. This cooler was in the form of an indirect water cooler charged with cooling water. It could also have been in the form of an indirect air cooler or as a cooler combining both types of cooling devices.

After further cooling the cooling water was recirculated through duct 17 into the top portion of the open surface cooler 10.

As the drawing shows a duct 7 branches off the duct 15. Through this duct 7 that portion of water is withdrawn which must be passed into the disintegrator 6. To compensate for loss of water thus caused additional water, if necessary, was introduced through the duct 18 and was passed through the equalizing tank 13 into the internal cooling water circulation of the open surface cooler 10.

The advantages of the process of the invention can be summarized as follows:

(1) Depending on the fineness, type and amount of dust up to 95% of the dust-like impurities present in the partial oxidation gas are eliminated in the dust separator. This dust can be discharged without difficulty and may be passed to a dump or for other use.

(2) The wet washer according to the invention was charged only with an amount of water as was necessary for removing the residual amount of dust from the gas. No additional water was added in this step for cooling purposes. For this reason the amount of water required in the process of the invention is only about 20% of the amount of water heretofore necessary.

(3) Because of this small amount of wash water and the fact that suspended or dissolved therein are only about 10% of the dust initially present in the gas, a relatively small waste water treatment installation may be used for processing the wash water and such small installation therefore requires a smaller amount of space.

(4) It stands to reason that the comparatively small amount of wash water also contains a correspondingly smaller amount of the toxic components which have been dissolved out of the gas, such as HCN, $H_2S$ and COS. This also simplifies the waste water treatment. This can be carried out in a comparatively small enclosed installation which therefore lowers the risk of environmental hazards.

(5) Contrary to the prior art processes a re-cooling step in regard to the wash water discharged from the wet washer is not necessary in the process of the invention. For this purpose in the prior art a special cooling tower was required. A cooling tower in this stage is again not necessary in the invention.

(6) Since the gas to be purified is contacted only with a comparatively small amount of wash water, the undesirable introduction of oxygen into the gas is kept at a low level. The lack of a cooling tower in this connection is highly favorable since these towers always result in a heavy charge of oxygen into the wash water.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for purifying and cooling hot partial oxidation gases formed in a gasifier for solid or liquid fuel, which gases contain dust-like impurities in the form of soot, coal dust and fly ash and gaseous impurities of $H_2S$, HCN and/or COS, comprising, in order the steps of introducing the partial oxidation gases into a single mechanical dry dust separator at an entry speed between about 15 about 25 m/sec so as to eliminate 70 to 95% of the dust-like impurities; washing the gases in a wet washer having no cooling function with only that amount of water required to remove most of the residual dust from the gas, about 1.1 $l/Nm^3$ of gas; passing the gas into the bottom portion of a direct gas cooler provided with an internal water circuit; recycling the water discharged from the bottom of said direct gas cooler, passing part into said wet washer while passing another part, after an intermediate cooling step, into the top portion of said direct gas cooler to be the water for the internal water circuit; and discharging cool, purified gas from the top of the said direct gas cooler.

2. A process for purifying and cooling hot partial oxidation gases formed in a gasifier for solid or liquid fuel, which gases contain dust-like impurities in the form of soot, coal dust and fly ash and gaseous impurities of $H_2S$, CHN and/or COS, comprising, in order, the steps of introducing the partial oxidation gases into a single mechanical dry dust separator at an entry speed between about 15 and 25 m/sec so as to eliminate 70 to 95% of the dust-like impurities; effecting intermediate cooling of the partial oxidation gases, by direct cooling through injection of water, the water limited to an amount which will completely evaporate in the gas current; washing the gases in a wet washer having no cooling function with only that amount of water required to remove most of the residual dust from the gas; passing the gas into the bottom portion of a direct gas cooler provided with an internal water circuit; recycling the water discharged from the bottom of said direct gas cooler, passing part into said wet washer while passing another part, after an intermediate cooling step, into the top portion of said direct gas cooler to be the water for the internal water circuit; and discharging cool, purified gas from the top of said direct gas cooler.

3. The process of claim 2, wherein said wet washer is in the form of a Venturi washer if the partial oxidation gases are formed under pressure greater than about 0.3 atmospheres above atmospheric pressure.

4. The process of claim 2, further comprising the step of pre-cooling the partial oxidation gases prior to introduction into said dry dust separator.

5. The process of claim 4, wherein the pre-cooling step is performed in a waste boiler heater.

* * * * *